(12) United States Patent
Rose et al.

(10) Patent No.: US 9,668,126 B2
(45) Date of Patent: May 30, 2017

(54) PREVENTING LOCATION TRACKING VIA SMARTPHONE MAC ADDRESS (71) Applicant: Lenovo (Singapore) Pte. Ltd., Singapore (SG)

(72) Inventors: Amy L. Rose, Chapel Hill, NC (US); Nathan J. Peterson, Durham, NC (US); John S. Crowe, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 14/458,219

(22) Filed: Aug. 12, 2014

(65) Prior Publication Data

US 2016/0050559 A1 Feb. 18, 2016

(51) Int. Cl.
*H04W 4/00* (2009.01)
*H04W 12/02* (2009.01)
*H04L 29/12* (2006.01)
*H04W 8/26* (2009.01)
*H04W 76/02* (2009.01)
*H04W 48/08* (2009.01)
*H04W 88/08* (2009.01)
*H04W 84/12* (2009.01)

(52) U.S. Cl.
CPC ......... *H04W 12/02* (2013.01); *H04L 61/2092* (2013.01); *H04L 61/6004* (2013.01); *H04L 61/6022* (2013.01); *H04W 8/26* (2013.01); *H04W 48/08* (2013.01); *H04W 76/021* (2013.01); *H04W 84/12* (2013.01); *H04W 88/08* (2013.01)

(58) Field of Classification Search
CPC ..................................................... H04W 12/00
See application file for complete search history.

(56) References Cited

U.S. PATENT DOCUMENTS

| | | | | |
|---|---|---|---|---|
| 6,324,650 | B1 * | 11/2001 | Ogilvie ............... | G06F 21/6209 726/2 |
| 2004/0111494 | A1 * | 6/2004 | Kostic ............... | H04L 29/12216 709/220 |
| 2005/0138178 | A1 * | 6/2005 | Astarabadi ........ | H04W 36/0083 709/227 |
| 2008/0168123 | A1 * | 7/2008 | Ojanen .................. | H04L 67/02 709/201 |
| 2012/0076072 | A1 * | 3/2012 | Jalfon .................. | H04W 12/02 370/328 |
| 2012/0266217 | A1 * | 10/2012 | Kaal .................. | H04L 63/0407 726/4 |

(Continued)

*Primary Examiner* — Kevin C Harper
(74) *Attorney, Agent, or Firm* — VanLeeuwen & VanLeeuwen; Carlos Munoz-Bustamante (57) ABSTRACT An approach is provided for a wireless mobile device that includes a processor, a wireless adapter, and a memory to connect to an access point using a generated random pseudo-MAC address that reduces address collisions with other devices. The approach generates a dynamic MAC address for the device. The dynamic MAC address includes a static portion that is based on a portion of an actual MAC address of the device and a dynamic portion that is based on a quasi-random value. The device wirelessly connects to an access point using the generated dynamic MAC address.

19 Claims, 6 Drawing Sheets (56) References Cited

U.S. PATENT DOCUMENTS

| | | | |
|---|---|---|---|
| 2014/0269476 A1* | 9/2014 | Weston | H04W 52/0206 370/311 |
| 2014/0293936 A1* | 10/2014 | Wang | H04L 12/4625 370/329 |
| 2015/0063205 A1* | 3/2015 | Elliott | H04L 61/6022 370/328 |
| 2015/0095501 A1* | 4/2015 | Candelore | H04L 61/2092 709/227 |

* cited by examiner

PREVENTING LOCATION TRACKING VIA SMARTPHONE MAC ADDRESS

BACKGROUND

Generating random MAC addresses at a device may allow a degree of anonymity when a user communicates with public access points (APs), such as found in commercial and shopping areas. Many stores track where customers go inside the store and how long they spend in each section of the store by analyzing the access points that communicate with a customer's smart device. If a customer moves around in the store, they connect to a different access point and the store can determine where the customer has gone and how long they spent in each section. This knowledge is usually obtained without the customer's consent or the customer having to enable this with their device. The access points record the MAC addresses transmitted in normal 802.11 probe broadcast requests that are transmitted when Wi-Fi is enabled on the customer's device. This is a privacy concern. One approach is to have the customer's device generate random pseudo-MAC addresses that look like a genuine MAC address but are not the actual MAC address of the user's device. A challenge, however, is the risk of collisions since MAC addresses need to be unique. If a duplicate MAC address is detected by the network, an error occurs causing network disruption.

SUMMARY

An approach is provided for a wireless mobile device that includes a processor, a wireless adapter, and a memory to connect to an access point using a generated random pseudo-MAC address that reduces address collisions with other devices. The approach generates a dynamic MAC address for the device. The dynamic MAC address includes a static portion that is based on a portion of an actual MAC address of the device and a dynamic portion that is based on a quasi-random value. The device wirelessly connects to an access point using the generated dynamic MAC address.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
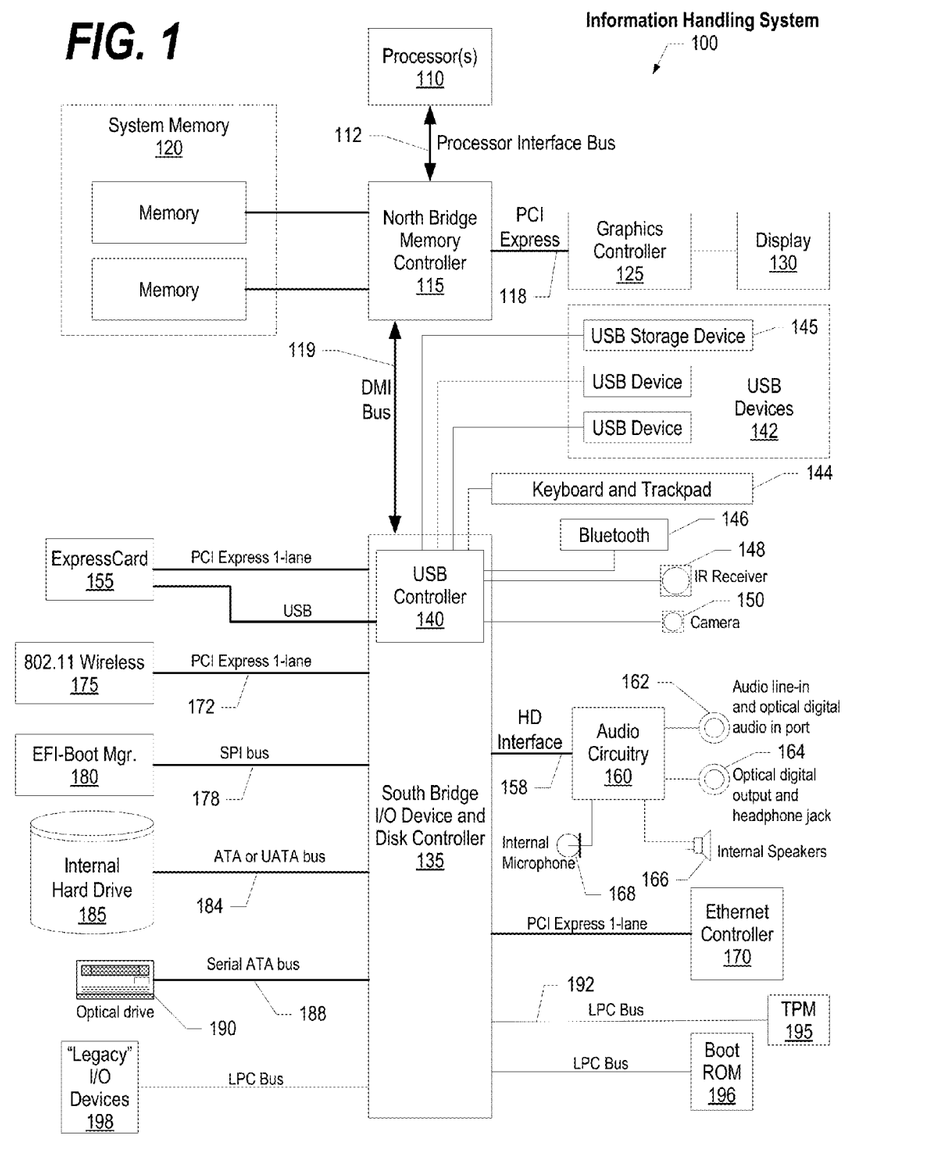
FIG. 1 is a block diagram of a data processing system in which the methods described herein can be implemented.
Figure 2:
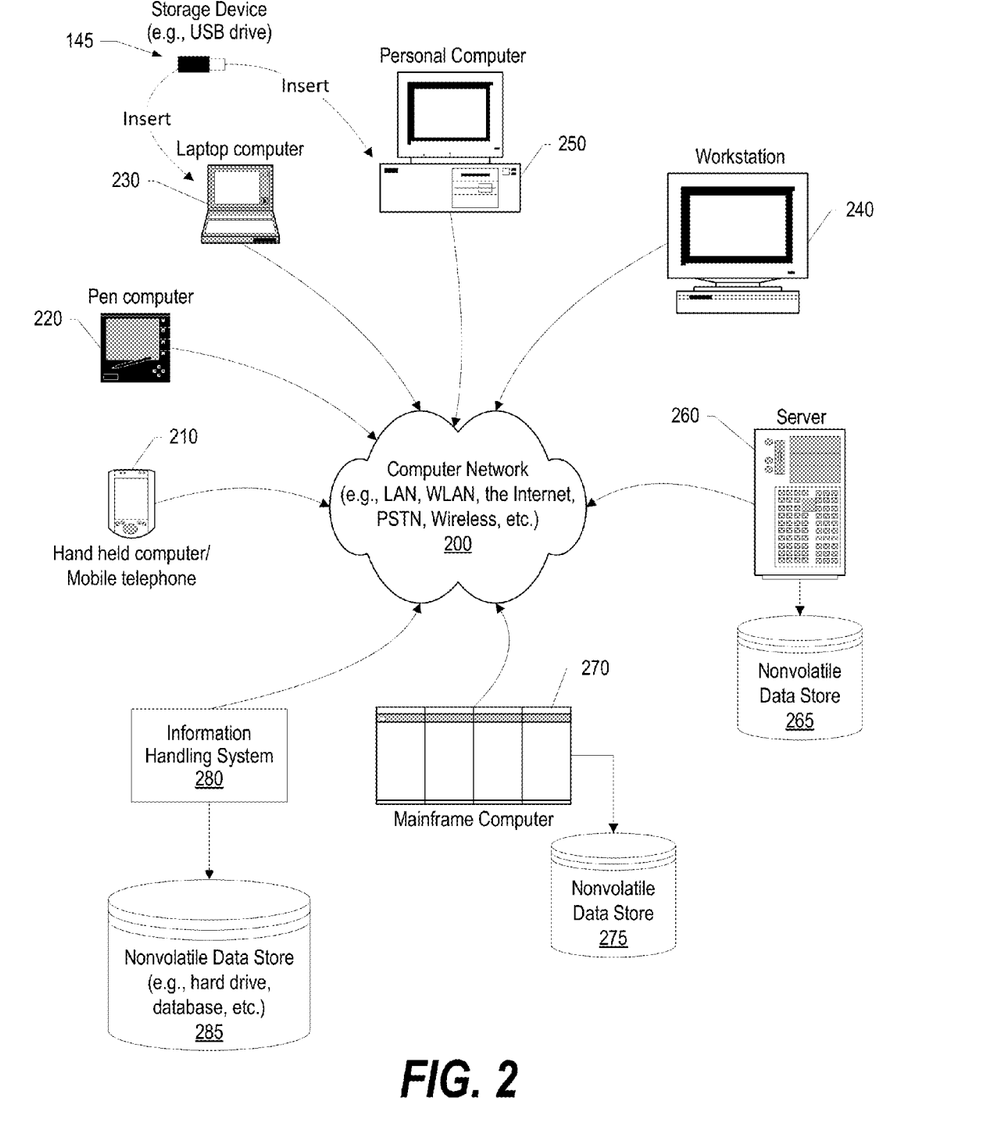
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
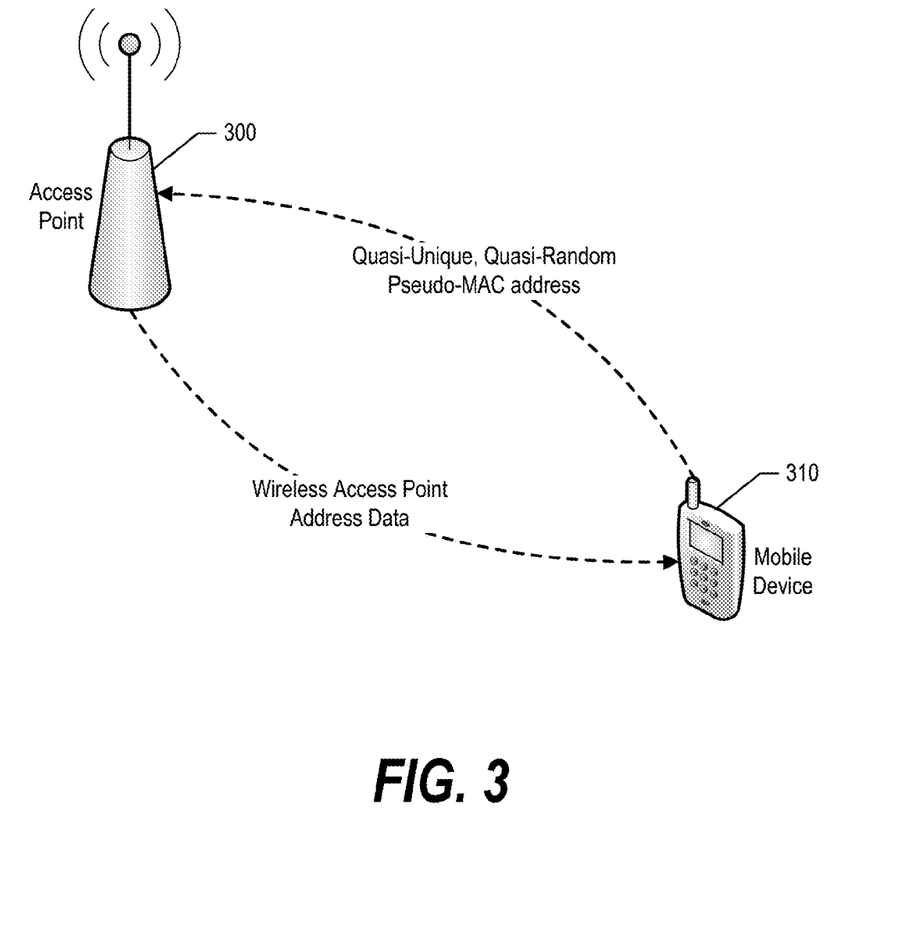
FIG. 3 is a component diagram showing the interaction between the mobile device that generates random pseudo-MAC address with reduced collisions and an access point.

FIG. 3 is a component diagram showing the interaction between the mobile device that generates random pseudo-MAC address with reduced collisions and an access point. Access point 300 is a device that allows wireless devices to connect to a wired network using Wi-Fi, or related standards. The access point often connects to a router (via a wired network) as a standalone device, however the access point can also be an integral component of the router itself. Wireless mobile device 310 is a type of device that wirelessly connects to a computer network using access point 300. Device 310 can be any type of device that wirelessly connects to access point 300. Such devices include smart phones, laptop computer system, tablet computer systems, and the like. The amount, and types of, devices that wirelessly connect to access point 300 is anticipated to increase greatly due to the interconnection of uniquely identifiable embedded computing like devices within the existing Internet infrastructure. This interconnection is often referred to as the "Internet of Things" (IoT) or "Cloud of Things" (CoT). Things, in the IoT, can refer to a wide variety of devices such as heart monitoring implants, biochip transponders on farm animals, automobiles with built-in sensors, or field operation devices that assist fire-fighters in search and rescue. Consequently, the number and types of devices connecting to access point 300 in many environments, such as shopping malls, etc. is anticipated to increase dramatically beyond traditional smart phones, laptop computers, tablet computers, and the like.

For various privacy reasons, such as tracking of a user's device while the user is shopping at a particular location, user's device 310 generates a dynamic media access control (MAC) address that corresponds to the device. The dynamic MAC address includes a static portion that is based on a portion of an actual MAC address of the device and a dynamic portion that is based on a quasi-random value. The quasi-random value can be based on the user's current location (e.g., GPS coordinates, etc.), service set identification (SSID) and MAC address of the access point to which the user is connecting, a random seed, and by using a salt of the specific time that the dynamic MAC address is generated by the device. In one embodiment, the static portion of the dynamic MAC address is based on the three byte Organizationally Unique Identifier (OUI) portion of the device's actual (real) MAC address. Device 310 connects to access point 300 using the generated dynamic MAC address rather than the device's actual MAC address. Additional dynamic MAC addresses are generated and provided to other access points as the user moves about making tracking of the individual exceedingly difficult or impossible by using only the MAC address that is provided to such access points. In one embodiment, the device adds a flag to the 802.11 frame that tells the access point to send a probe response the MAC that is sending a probe request, but not add the MAC address to the MAC address table maintained by the access point. In one embodiment, this flag is set in the MAC header. As used herein, "connecting" a wireless device to an access point includes either a "probe" request or an "association" request with the probe request being used to probe for nearby access points and the association request being used to associate the wireless device with the access point so that the wireless device can wirelessly transmit data over a network (e.g., the Internet, etc.) by way of the access point.

Figure 4:
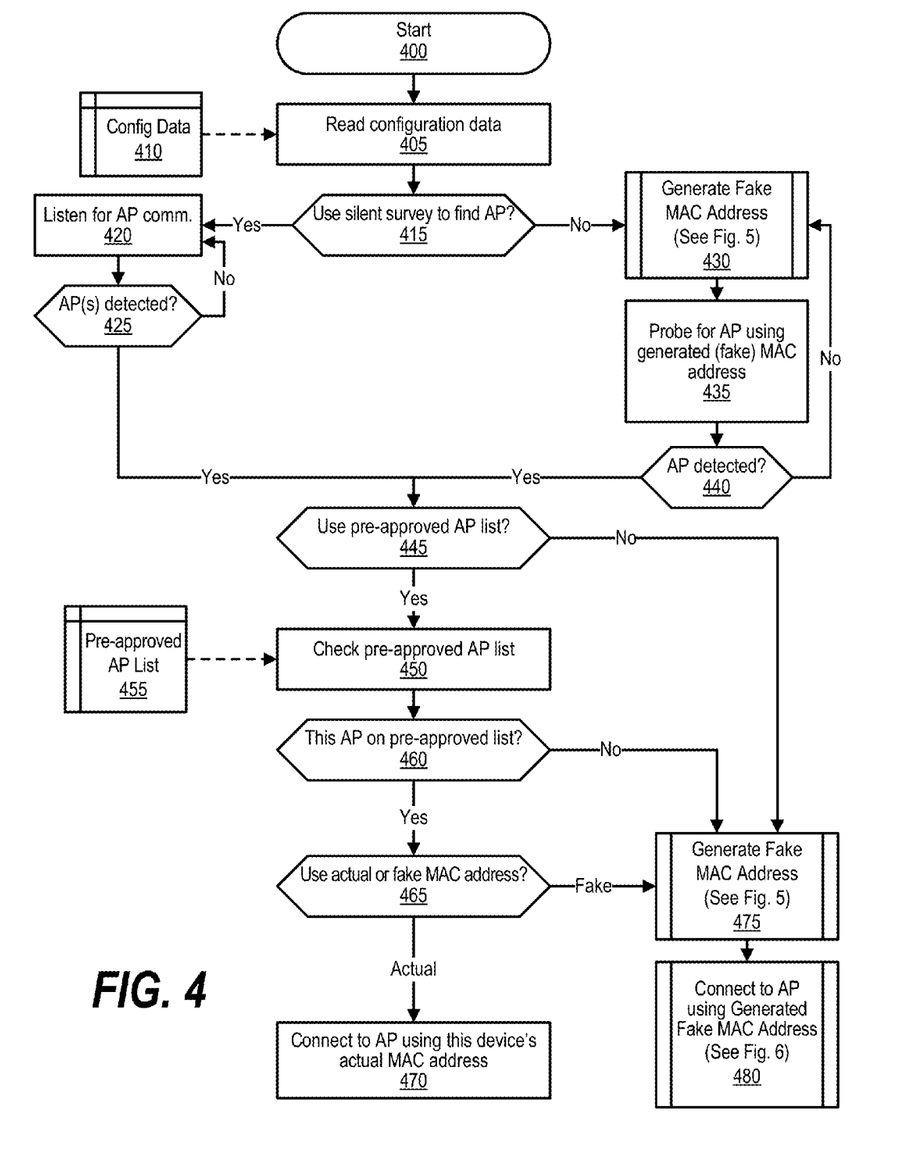
FIG. 4 is a flowchart showing steps taken at the user device to generate random pseudo-MAC addresses while reducing the chance of a MAC address collision on the network.

FIG. 4 is a flowchart showing steps taken at the user device to generate random pseudo-MAC addresses while reducing the chance of a MAC address collision on the network. FIG. 4 commences at 400 whereupon, at step 405, the process reads configuration data from configuration memory area 410. The process determines as to whether use a silent survey to find nearby access points (decision 415). If silent survey is used to find access points, then decision 415 branches to the 'yes' branch to find access points. On the other hand, if a silent survey is not being used to find access points, then decision 415 branches to the 'no' branch to find access points by probing. Following the 'yes' branch, at step 420, the process listens for access point communications without probing for access points. To listen to communications, the wireless device enters a "promiscuous mode" which is a mode for a wireless network interface controller in the device that causes the controller to pass all traffic it receives to the device's central processing unit rather than passing only the frames that the controller is intended to receive. This mode is normally used for packet sniffing. By listening to all traffic, the addresses of nearby access points can be determined without directly requesting such access point addresses using a traditional probe request. The process determines as to whether one or more access points were detected by listening to the wireless traffic (decision 425). If access points were detected, then decision 425 branches to the 'yes' branch for further processing. On the other hand, if access points were not detected, then decision 425 branches to the 'no' branch which loops back to step 420 to continue listening to wireless traffic. This looping continues until an access point is detected, at which point decision 425 branches to the "yes" branch for further processing.

Returning to decision 415, if a silent survey is not being used to find the access point, then decision 415 branches to 'no' branch to probe for an access point using a dynamic MAC address. At predefined process 430, the process performs the Generate Dynamic MAC Address routine (see FIG. 5 and corresponding text for processing details). Predefined process 430 generates a dynamic MAC address for the device so that the device can communicate with an access point using a dynamic MAC address rather than the device's actual MAC address. At step 435, the process probes for access points using the generated dynamic MAC address. The process determines as to whether any access points were detected based on the probe request (decision 440). If an access point was detected, then decision 440 branches to the 'yes' branch for further processing. On the other hand, if an access point was not detected, then decision 440 branches to the 'no' branch which loops back to generate a new dynamic MAC address and send another probe request. This looping continues until an access point is detected, at which point decision 440 branches to the 'yes' branch for further processing.

The process determines as to whether a pre-approved access point list has been configured for this device to use (decision 445). If the device is not using a pre-approved access point list, then decision 445 branches to the 'no' branch bypassing steps 450 through 470. However, if a pre-approved access point list is being used, then decision 445 branches to the 'yes' branch to process the pre-approved access point list. At step 450, the process checks the pre-approved access point list by retrieving the list of approved access points from memory area 455. The process determines as to whether the access point that has been found is on the pre-approved access point list (decision 460). If the access point is on the pre-approved list, then decision 460 branches to the 'yes' branch for further processing. On the other hand, if this access point is not on the pre-approved list, then decision 460 branches to the 'no' branch which bypasses decision 465 and step 470.

If the access point is on the pre-approved list, then the process determines as to whether to use the actual MAC address of the device or use the generated dynamic MAC address to connect to the access point (decision 465). If the device is using the actual MAC address to connect to this access point, then decision 465 branches to the 'Actual' branch whereupon, at step 470, the process connects to the access point using this device's actual MAC address. On the other hand, if the dynamic MAC address is being used to connect to this access point, then decision 465 branches to the 'Dynamic' branch bypassing step 470.

If either a pre-approved access point list is not being used (decision 445 branching to the 'no' branch), the access point is not on the pre-approved list (decision 460 branching to the 'no' branch), or a dynamic MAC address should be used to connect to the access point even though the access point is on the pre-approved list (decision 465 branching to the 'dynamic' branch), then the process executes predefined process 475. At predefined process 475, the process performs the Generate Dynamic MAC Address routine (see FIG. 5 and corresponding text for processing details) to generate a dynamic MAC address that will be used to connect to the access point. At predefined process 480, the process performs the Connect to AP using Generated Dynamic MAC Address routine (see FIG. 6 and corresponding text for processing details) to connect the wireless device to the access point.

Figure 5:
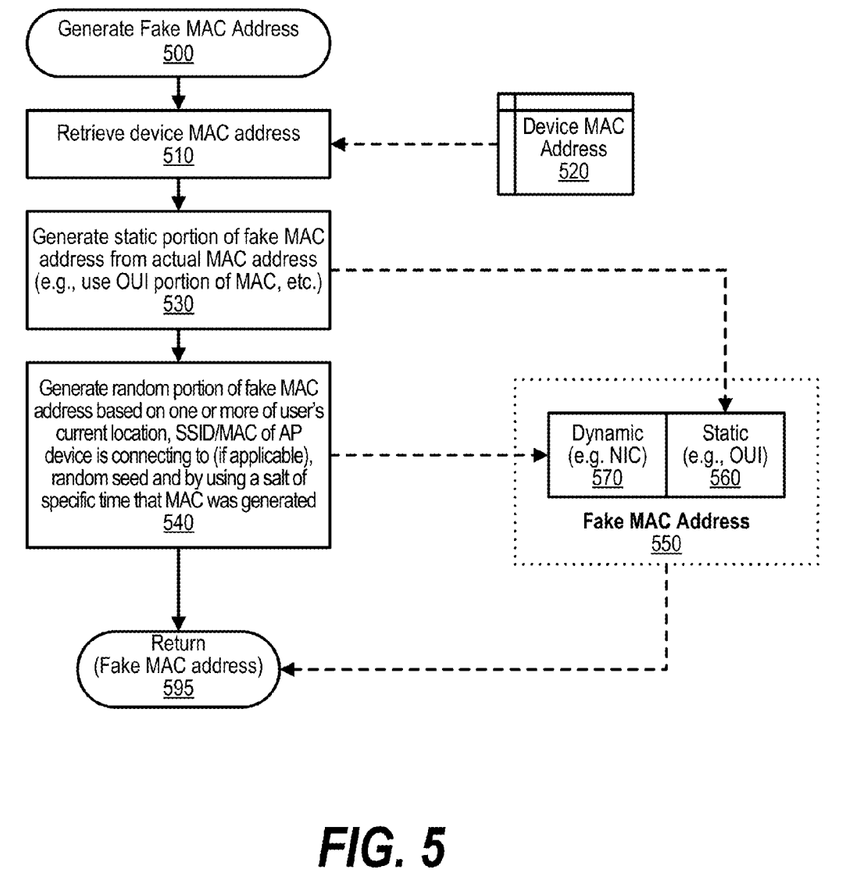
FIG. 5 is a flowchart showing steps taken by a process that generates a random, dynamic MAC address.

FIG. 5 is a flowchart showing steps taken by a process that generates a random, dynamic MAC address. FIG. 5 processing commences at 500 and shows the steps taken by a process that performs the Generate Dynamic MAC address routine. At step 510, the process retrieves the device's actual MAC address from the device's MAC address memory area 520. At step 530, the process generates the static portion of dynamic MAC address 550 from a portion of the actual MAC address. In one embodiment, the portion of the actual MAC address that is used to generate the static portion of the dynamic MAC address is the Organizationally Unique Identifier (OUI) portion of the actual MAC address. Dynamic MAC address 550 includes memory area 560 where the static portion of the dynamic MAC address is stored (e.g., the OUI, etc.). Dynamic MAC address 550 also includes memory area 570 which is where the dynamic portion of the dynamic MAC address is stored (e.g., random number, etc.). At step 540, the process generates the dynamic portion of dynamic MAC address based on one or more of user's current location (e.g., GPS coordinates, etc.), service set identification (SSID) and MAC address of the access point to which the user is connecting, a random seed, and by using a salt of the specific time that the dynamic MAC address is generated by the device. The quasi-random data generated by step 540 is stored in memory area 570 which is the dynamic portion of dynamic MAC address 550. Other bases of random number generation can be used to generate dynamic portion 570 of dynamic MAC address 550. FIG. 5 processing thereafter returns to the calling routine (see FIG. 4) at 595.

Figure 6:
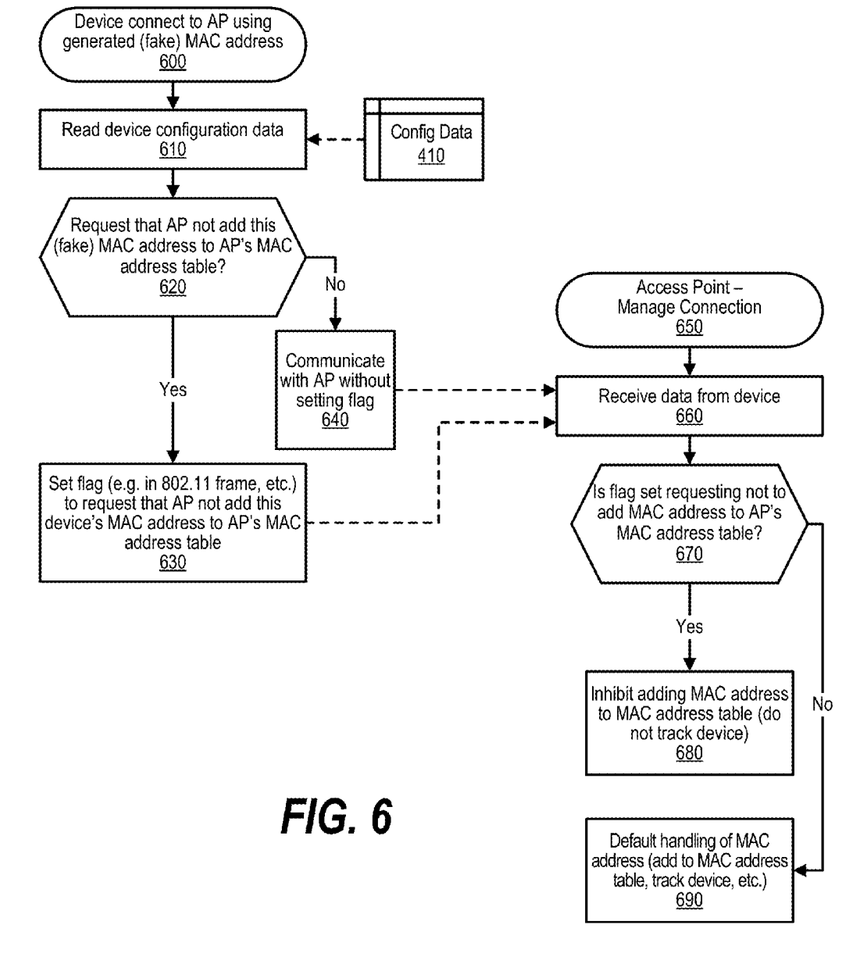
FIG. 6 is a flowchart showing steps taken by the device connecting to an access point using the generated (dynamic) MAC address.

FIG. 6 is a flowchart showing steps taken by the device connecting to an access point using the generated (dynamic) MAC address. FIG. 6 processing commences at 600 and shows the steps taken by a process that performs steps to connect the device to an access point using a generated dynamic MAC address. At step 610, the process reads device configuration data from configuration memory area 410. The process determines as to whether to request that the access point not add this device's MAC address to the access point's MAC address table (decision 620). If the device is requesting that the access point not add this device's MAC address to the access point's MAC address table, then decision 620 branches to the 'yes' branch whereupon, at step 630, the process sets a flag (e.g. in an 802.11 frame, etc.) that requests that the access point not add this device's MAC address to the access point's MAC address table. On the other hand, if the device is not requesting that the access point not add this device's MAC address to the access point's MAC address table, then decision 620 branches to the 'no' branch whereupon, at step 640, the process communicates with the access point without setting the flag that requests that the access point not add this device's MAC address to the access point's MAC address table.

Processing performed by the access point commences at 650. At step 660, the access point receives data (e.g., authentication open request, association request, etc.) from the wireless device. The access point process determines as to whether the data received from the device has set a flag requesting not to add the device's MAC address to the access point's MAC address table (decision 670). If the device requested not to be added to the access point's MAC address table, then decision 670 branches to the 'yes' branch whereupon, at step 680, the process running in the access point inhibits adding the device's MAC address to the access point's MAC address table. This is essentially a "do not track" flag that prevents the organization, such as a shopping center, from tracking the whereabouts of customers. On the other hand, if the wireless device did not set the flag requesting not to be added to the access point's MAC address table, then decision 670 branches to the 'no' branch. At step 690, the access point's process performs defaults handling of the device's MAC address (e.g., adding the MAC address to the access point's MAC address table, tracking the device by the organization, etc.).

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
generating a dynamic media access control (MAC) address corresponding to a device, wherein the generated dynamic MAC address includes a static portion that is based on a portion of an actual MAC address of the device and a dynamic portion that is based on a quasi-random value, and wherein the generated dynamic MAC address is a 48-bit value;
connecting to an access point, via a wireless adapter, wherein the connecting uses the generated dynamic MAC address; and
requesting that the access point inhibit adding the generated dynamic MAC address to a table of MAC addresses maintained by the access point.

2. The method of claim 1 wherein the static portion is the Organizationally Unique Identifier (OUI) portion of the actual MAC address.

3. The method of claim 1 further comprising:
identifying one or more access points by probing an area proximate to the device for the access point; and
determining whether at least one of the identified access points is included in a pre-approved access point list accessible from the device.

4. The method of claim 3 further comprising:
identifying a pre-approved access point that is included in the pre-approved access point list; and
transmitting an association request to the pre-approved access point using the actual MAC address of the device.

5. The method of claim 3 further comprising:
in response to none of the one or more access points being included in the pre-approved access point list, transmitting an association request to the access point using the generated dynamic MAC address.

6. The method of claim 3 wherein the probing further comprises:
using a promiscuous mode at the device to listen to wireless traffic between the access point and other wireless devices, wherein an address of the access point is identified based on data included in the wireless traffic.

7. An information handling system comprising:
one or more processors;
a memory coupled to at least one of the processors;
a wireless adapter that wirelessly connects the information handling system to wireless devices; and
a set of instructions stored in the memory and executed by at least one of the processors to:
generate a dynamic media access control (MAC) address corresponding to the device, wherein the dynamic MAC address includes a static portion that is based on a portion of an actual MAC address of the device and a dynamic portion that is based on a quasi-random value, and wherein the generated dynamic MAC address is a 48-bit value;

connect to an access point using the generated dynamic MAC address; and request that the access point inhibit adding the generated dynamic MAC address to a table of MAC addresses maintained by the access point.

8. The information handling system of claim 7 wherein the static portion is the Organizationally Unique Identifier (OUI) portion of the actual MAC address.

9. The information handling system of claim 7 wherein the instructions to connect further comprise instructions to:
request that the access point inhibit adding the generated dynamic MAC address to a table of MAC addresses maintained by the access point.

10. The information handling system of claim 7 wherein the set of instructions further comprise instructions to:
identify one or more access points by probing an area proximate to the device for the access point; and
determine whether at least one of the identified access points is included in a pre-approved access point list accessible from the device.

11. The information handling system of claim 10 wherein the set of instructions further comprise instructions to:
identify a pre-approved access point that is included in the pre-approved access point list; and
transmit an association request to the pre-approved access point using the actual MAC address of the device.

12. The information handling system of claim 10 wherein the set of instructions further comprise instructions to:
in response to none of the one or more access points being included in the pre-approved access point list, transmit an association request to the access point using the generated dynamic MAC address.

13. The information handling system of claim 10 wherein the instructions to probe further comprise instructions to:
using a promiscuous mode at the device to listen to wireless traffic between the access point and other wireless devices, wherein an address of the access point is identified based on data included in the wireless traffic.

14. A computer program product comprising:
a computer readable storage medium comprising a set of computer instructions, the computer instructions effective to:

generate a dynamic media access control (MAC) address corresponding to the device, wherein the dynamic MAC address includes a static portion that is based on a portion of an actual MAC address of the device and a dynamic portion that is based on a quasi-random value, and wherein the generated dynamic MAC address is a 48-bit value;

connect to an access point using the generated dynamic MAC address; and request that the access point inhibit adding the generated dynamic MAC address to a table of MAC addresses maintained by the access point.

15. The computer program product of claim 14 wherein the static portion is the Organizationally Unique Identifier (OUI) portion of the actual MAC address.

16. The computer program product of claim 14 wherein the wherein the set of instructions to connect further comprises instructions to:
request that the access point inhibit adding the generated dynamic MAC address to a table of MAC addresses maintained by the access point.

17. The computer program product of claim 14 wherein the set of instructions further comprise instructions to:
identify one or more access points by probing an area proximate to the device for the access point; and
determine whether at least one of the identified access points is included in a pre-approved access point list accessible from the device.

18. The computer program product of claim 17 wherein the set of instructions further comprise instructions to:
identify a pre-approved access point that is included in the pre-approved access point list; and
transmit an association request to the pre-approved access point using the actual MAC address of the device.

19. The computer program product of claim 17 wherein the set of instructions further comprise instructions to:
in response to none of the one or more access points being included in the pre-approved access point list, transmit an association request to the access point using the generated dynamic MAC address.

\* \* \* \* \*